(12) United States Patent
Hirafuji

(10) Patent No.: US 6,898,616 B2
(45) Date of Patent: May 24, 2005

(54) ARBITRARY FUNCTION GENERATING CIRCUIT USING A SIMPLE OPERATIONAL ELEMENT AND AN ENCRYPTION METHOD THEREOF

(75) Inventor: Masayuki Hirafuji, Ibaraki (JP)

(73) Assignee: National Agriculture and Bio-oriented Research Organization, Tsukuba (JP)

(\*) Notice: Subject to any disclaimer, the term of this patent is extended or adjusted under 35 U.S.C. 154(b) by 962 days.

(21) Appl. No.: 09/761,747

(22) Filed: Jan. 18, 2001

(65) Prior Publication Data

US 2001/0008558 A1 Jul. 19, 2001

(30) Foreign Application Priority Data

Jan. 18, 2000 (JP) ........................................ 2000-009224

(51) Int. Cl.[7] .............................. G06G 7/00; G06G 7/18; G06G 7/16
(52) U.S. Cl. ........................ 708/800; 708/801; 708/823; 708/824; 708/845
(58) Field of Search ..................... 706/15; 380/220–221, 380/39–40, 44; 708/823–824, 800–801, 845

(56) References Cited

U.S. PATENT DOCUMENTS

2002/0051482 A1 \* 5/2002 Lomp ........................ 375/141

FOREIGN PATENT DOCUMENTS

DD          DD 294808 A  \* 10/1991   ............. G06F/7/38

\* cited by examiner

*Primary Examiner*—Emmanuel L. Moise
*Assistant Examiner*—Arezoo Sherkat
(74) *Attorney, Agent, or Firm*—Crowell & Moring LLP

(57) ABSTRACT

An arbitrary function generating circuit incorporating an analog multiplier, amplifier, and frequency multiplier to construct a nonlinear analog circuit equivalent to a generalized Lotka-Volterra equation for performing high-speed calculations.

7 Claims, 8 Drawing Sheets

ARBITRARY FUNCTION GENERATING CIRCUIT USING A SIMPLE OPERATIONAL ELEMENT AND AN ENCRYPTION METHOD THEREOF

BACKGROUND OF THE INVENTION

1. Field of the Invention

The present invention relates to an apparatus for simulating complex systems at a high rate of speed and also to a method of modulating signals for encryption.

2. Description of the Related Art

Numerical models for describing quantitative changes are a type of arbitrary function generator that produces specific functions based on the parameters provided. The models can be simulated at high speeds with an analog arithmetic circuit and, in fact, were simulated with analog computers in the past. However, these analog arithmetic circuits are rarely used anymore because the circuits have to be rewired for each problem and enormous circuits are required when the problems are of a large scale. Subsequently, wire connections in the analog arithmetic circuits were modified electrically through software, but this analog calculation method is no longer used because integrating complex circuits is extremely difficult.

In order to simulate a phenomenon having multiple variables at a high rate of speed, it is advantageous to generate arbitrary functions with an analog arithmetic circuit. For this method to be practical, however, it is necessary to programmably generate functions of different types without needing to physically change the wiring of the arithmetic circuit. Further, the circuit must have a simple construction such as RAM that facilitates high integration by repeating simple mask patterns. It is also necessary to minimize the number of components needed to construct the circuit.

A generalized Lotka-Volterra equation can be used in plant growth models or for the dynamics of biological communities and is represented by a differential equation such as the following.

$$\frac{dx_i}{dt} = x_i\left(r_i + \sum_{j=1}^{m}\mu_{ij}x_j\right) \; (i=1, 2, \ldots, n) \qquad \text{Equation 1}$$

Here, $x_i$ is the size of a population i representing the elements of a system; $\mu_{ij}$ is a constant of interaction between the elements; and $r_i$ is an inherent constant for each element representing the growth rate of the population i. When n is sufficiently large, this equation can approximate a positive arbitrary continuous function of an arbitrary precision by varying n and $\mu_{ij}$, it is possible to generate patterns of $x_i$ that change in various ways. Accordingly, in addition to modeling phenomena, this calculation has a wide range of applications as an arbitrary waveform generator. The present invention focuses on the symmetry of this equation to perform high-speed emulation by performing the calculation in hardware or using parallel processing with multiple digital computers.

SUMMARY OF THE INVENTION

In view of the foregoing, it is an object of the present invention to provide a simple calculation element, and particularly an arbitrary waveform generating circuit or random function generating circuit for solving the generalized Lotka-Volterra equation through an arithmetic circuit employing relatively simple circuit elements. It is another object of the present invention to provide an encryption/modulation method employing the arbitrary function generating circuit.

These objects and others will be attained by an arbitrary function generating circuit employing a simple arithmetic circuit element for calculating the following generalized Lotka-Volterra equation (Equation 1).

$$\frac{dx_i}{dt} = x_i\left(r_i + \sum_{j=1}^{m}\mu_{ij}x_j\right) \; (i=1, 2, \ldots, n) \qquad \text{Equation 1}$$

Here, $x_i$ is the size of a population i representing the elements of a system; $\mu_{ij}$ is a constant of interaction between the elements; and $r_i$ is an intrinsic constant for each element representing the growth rate of the population i. The arbitrary function generating circuit includes a plurality n of modules, each having a plurality n of input terminals and one output terminal; and a plurality n of connecting wires including a first connecting wire for connecting the output terminal of the first module to the first input terminal of each module; a second connecting wire for connecting the output terminal of the second module to the second input terminal of each module; and continuing in a like manner until the nth connecting wire for connecting the output terminal of the nth module to the nth input terminal of each module.

Each module comprises a group of n variable resistors connected to the n input terminals; an output sum connecting wire connecting the output terminals of the variable resistors in order to total their output values; a multiplier having an amplifier for multiplying the sum of the output values by the output value from the corresponding module; and an integrator for integrating the output values.

The generalized Lotka-Volterra equation is converted to Equation 7 below by setting the interaction coefficient $\mu_{ij}$ equivalent to the value of the variable resistors in each module. An arbitrary module in the group of modules is designated as the first module to output constant value 1. A fixed value $r_i$ is replaced by the value $\mu_{ij}$ in the variable resistors input via the first input terminal of each module by the first connecting wire.

$$\frac{dx_i}{dt} = x_i\sum_{j=1}^{n}\mu_{ij}x_j \; (i=1, \ldots, n) \qquad \text{Equation 7}$$

The arithmetic circuit calculates the converted generalized Lotka-Volterra equation by iterating the following process in which the size $x_i$ (i=1, 2, . . . , n) of a population i representing the elements comprising the system for generating an arbitrary function is output by the output terminal of each of n modules. This output is transferred to a group of input terminals in a group of modules via n input connection wires and totaled by a connection wire.

According to another aspect of the present invention, the arbitrary function generating circuit further includes an interaction constant setting means for programmably changing each value in the group of variable resistors in each module. Alternatively, FET semiconductor element circuits are provided as the variable resistors in each module. The resistance values in the variable resistors are varied externally using control signals.

According to another aspect of the present invention, an arbitrary function generating circuit includes a plurality (n) of modules each having one input/output signal terminal, and one signal bus connecting each of the input/output signal terminals. Each module comprises a frequency synthesizer; a first multiplier for multiplying the output from the frequency synthesizer with the value input from the signal bus via the input/output terminal; a low pass filter for removing the AC component from the value output by the first multiplier; a second multiplier into which the output from the low pass filter is input; an integrator for integrating the output from the second multiplier; a connecting circuit for inputting the value output from the integrator into the second multiplier, such that the second multiplier can multiply this value from the value output by the low pass filter; an oscillator; and a third multiplier connected to the input/output terminal for multiplying the value output by the oscillator with the value output from the integrator.

The value $x_i$ (i=1, 2, ..., n) output by the integrator in each module is the number of elements constructing a system for generating an arbitrary waveform function and is multiplied with a carrier wave signal having an angular frequency $\omega_i$ generated by the oscillator by the third multiplier. The multiplied value $x_i \sin \omega_i t$ is output from each module to the signal bus; and an addition value e as shown in Equation 8 is generated by multiplexing the output from each module and re-input via the signal bus.

$$e = x_1 \sin \omega_1 t + x_2 \sin \omega_2 t + \ldots + x_n \sin \omega_n t \qquad \text{Equation 8}$$

The value output from the frequency synthesizer is set to a voltage $W_1$ shown in Equation 9 generated by multiplexing the interaction coefficient $\mu_{ij}$.

$$W_i = \mu_{1i} \sin \omega_1 t + \mu_{2i} \sin \omega_2 t + \ldots + \mu_{ni} \sin \omega_n t \qquad \text{Equation 9}$$

The addition value e is multiplied by the voltage $W_1$ in the first multiplier and passed through the low pass filter to obtain the DC component shown in Equation 10.

$$eW_i = \mu_{1i} x_1 + \mu_{2i} x_2 + \ldots + \mu_{ni} x_n \qquad \text{Equation 10}$$

This value $eW_i$ is multiplied by the value of $x_i$ output by the integrator in the second multiplier and integrated in the integrator to obtain the signal for $x_i$. The signal $x_i$ is multiplied in the third multiplier by the carrier wave generated by the oscillator to obtain the signal $x_1 \sin \omega_1 t$. The signal $x_i \sin \omega_i t$ is output onto the signal bus via the input/output terminal; and the process is repeated.

According to another aspect of the present invention, the arbitrary function generating circuit further includes a means for setting the voltage $W_i$ with the frequency synthesizer that is provided either external to the module as an amplifying circuit for extracting signals from the internal oscillator and adding weight to the signal or internal to the module as an independent circuit.

According to another aspect of the present invention, an arbitrary function generating circuit includes a frequency synthesizer that outputs a value W; a first multiplier that receives the output value W as one input value; a first low pass filter for cutting out a first frequency component from the value output from the first multiplier; a second multiplier that receives the value $e_4$ output from the first low pass filter as one input value; a second low pass filter that removes a second frequency component lower than the first frequency component from the value output from the second multiplier; an adder that receives the output value $e_5$ as one input value; a delay circuit that delays the output value $e_1$ and sets the output value $e_1$ as the second input value to the adder; a first frequency multiplier that multiplies the frequency of the output value $e_1$ and outputs an output value $e_2$ as the second input value for the second multiplier; and a second frequency multiplier that multiplies the frequency of the output value $e_1$ and outputs an out put value $e_3$ as the second input value for the first multiplier.

The amplitude of the signal $x_1$ (i=1, 2, ..., n) in Equation 7 is expressed by the AC signal $x_i \sin(i\omega_0)$. Here, i=1, 2, ..., n. and $\omega_0$ is a basic angular frequency. The signal $e_1$ output from the adder is added to the total signal $x_i$ to generate a frequency multiplexed signal as shown in Equation 11.

$$e_1 = x_1 \sin(\omega_0)t + x_2 \sin(2\omega_0)t + \ldots + x_n \sin(n\omega_0) t \qquad \text{Equation 11}$$

The frequency multiplexed signal $e_1$ is constantly maintained in a closed loop delayed by the delay circuit only a time sufficiently longer than the period of the base frequency $\omega_0$. The first frequency multiplier multiplies the frequency of the signal $e_1$ by $\alpha$ (n<<$\alpha$) and outputs the signal $e_2$. The second frequency multiplier multiplies the frequency of the signal $e_1$ by $\beta$ ($\alpha$<<$\beta$) and outputs the signal $e_3$. The frequency synthesizer generates at once a signal W that multiplexes the interaction coefficient $\mu_{ij}$ (i and j=1, 2, ..., n) and outputs the signal W. The first multiplier multiplies the signals $e_3$ and the W. The first low pass filter removes the frequency component greater than a frequency near $\beta\omega_0$ and outputs the following signal $e_4$. The second multiplier multiplies the signals $e_2$ and $e_4$. The second low pass filter removes the frequency component greater than a frequency near $\alpha\omega_0$ and outputs the following signal $e_5$ shown by Equation 18.

$$e_5 = x_1 \left( \sum_{j=1}^{n} \mu_{1j} x_j \right) \sin(\omega_0)t + \qquad \text{Equation 18}$$

$$x_2 \left( \sum_{j=1}^{n} \mu_{2j} x_j \right) \sin(2\omega_0)t + \ldots +$$

$$x_n \left( \sum_{j=1}^{n} \mu_{nj} x_j \right) \sin(n\omega_0)t$$

The generated signal $e_5$, which corresponds to the frequency multiplexed differential signal $de_1/dt$ on the right side of Equation 7, is added to the signal $e_1$ in the adder to perform the integration of Equation 7.

According to another aspect of the present invention, an encryption method using the arbitrary function generating circuit described above sets the initial value $e_1|_{t=0}$ of the frequency multiplexed signal $e_1$ as the code to be encrypted and the signal W output from the frequency synthesizer as the key code for encryption. A time change pattern of the signal $e_1$ or the signal $e_1|_{t=T}$ at a time T is encrypted.

According to another aspect of the present invention, the signal W output from the frequency synthesizer is used as the code to be encrypted and the initial value $e_1|_{t=0}$ of the frequency multiplexed signal $e_1$ is used as the key code for encryption.

DESCRIPTION OF THE PREFERRED EMBODIMENTS

Figure 1:
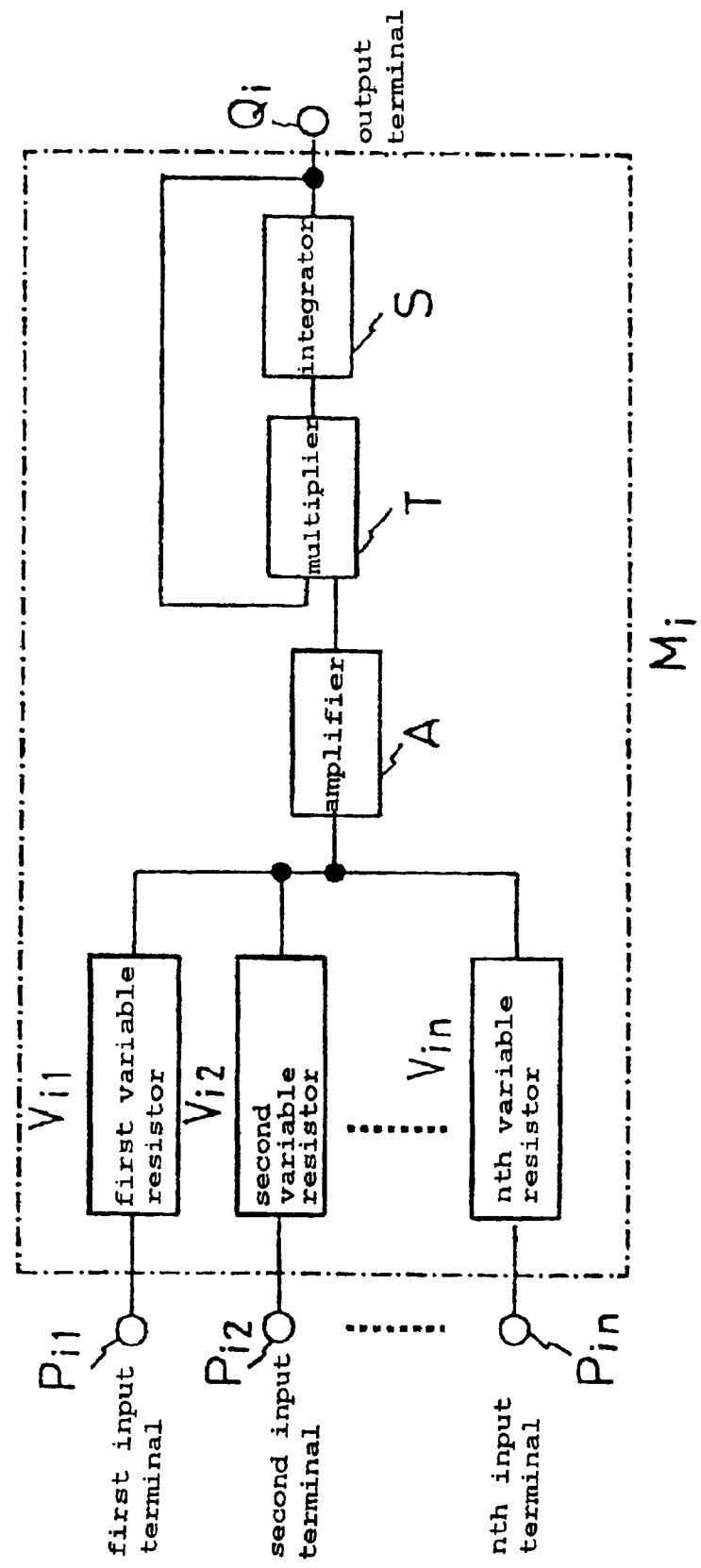
FIG. 1 is a block diagram showing a module of the first embodiment used in a random function generating circuit of the present invention.
Figure 2:
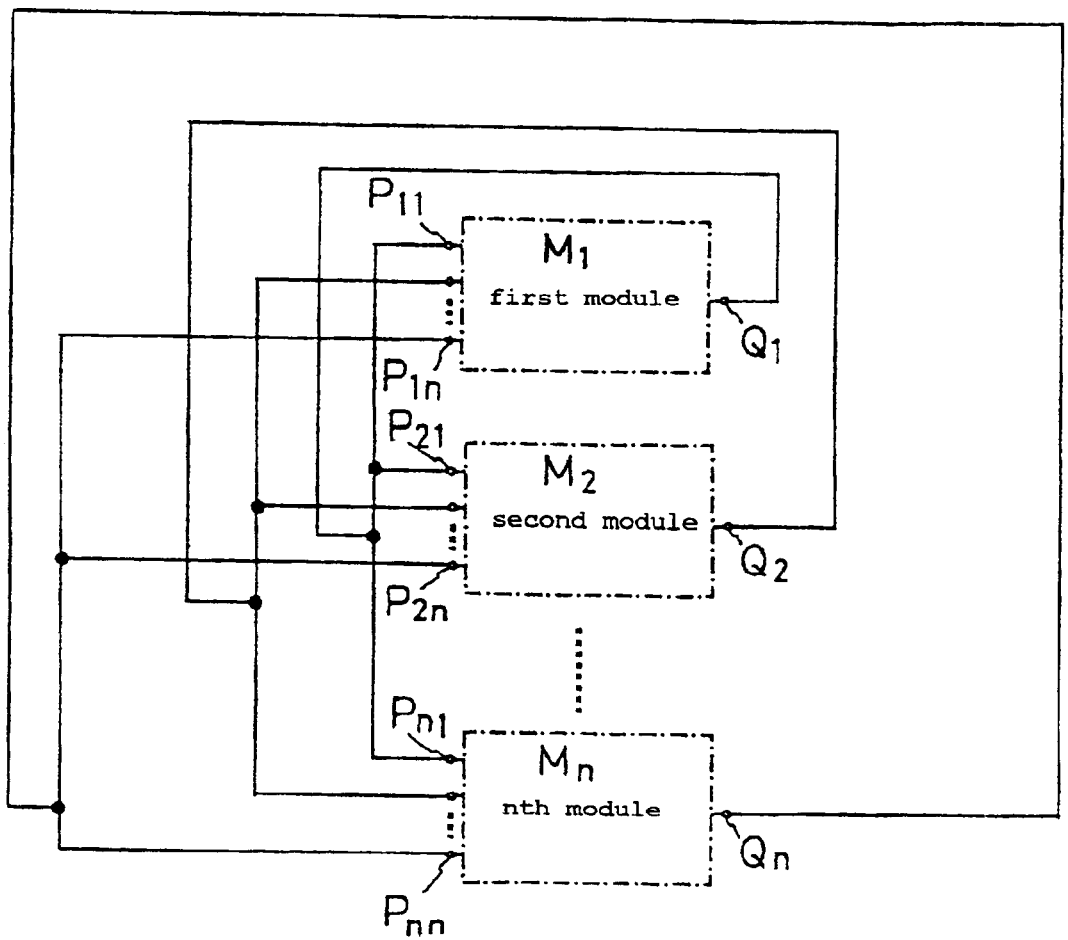
FIG. 2 is a block diagram showing the overall schematic of an arithmetic circuit of the first embodiment.

An arbitrary function generating circuit according to preferred embodiments of the present invention will be described while referring to the accompanying drawings. A first embodiment will be described with reference to FIGS. 1 and 2. FIG. 2 shows an overall schematic for an arithmetic circuit of a generalized Lotka-Volterra equation, while FIG. 1 is a block diagram of a module in that circuit.

Here, $M_i$ represents an arbitrary module. The arithmetic circuit is configured of n number of modules. Each module has n number of input terminals $P_{ij}$ and one output terminal $Q_1$.

The arithmetic circuit further comprises a first connecting wire for connecting the output terminal $Q_1$ of the first module $M_1$ to the first input terminals $P_{11}, P_{21}, \ldots, P_{n1}$ of each module; a second connecting wire for connecting the output terminal $Q_2$ of the second module $M_2$ to the second input terminals $P_{12}, P_{22}, \ldots, P_{n2}$ of each module; and continuing in this way to an nth connecting wire for connecting the output terminal $Q_n$ of the nth module $M_n$ to the nth input terminal $P_{1n}, P_{2n}, \ldots, P_{nn}$ of each module.

Each module further comprises n input terminals $P_{ij}$, n variable resistors $V_{ij}$ connected to the corresponding input terminals $P_{ij}$, connecting wires that add up the outputs from each of the variable resistors $V_{ij}$, an amplifier A for amplifying the these totaled values, a multiplier T for multiplying the totaled value with the module output value, and an integrator S for integrating this output.

The generalized Lotka-Volterra equation can be computed by connecting arbitrary modules $M_i$ of FIG. 1 in the configuration shown in FIG. 2. Here, we will assume that an interaction coefficient $\mu_{ij}$ is equivalent to the value of the variable resistors $V_{ij}$ in each module and that one special module that outputs a fixed value is provided such that $r_i$ is the input value. Accordingly, Equation 1 can be rewritten as follows.

$$\frac{dx_i}{dt} = x_i\left(r_i + \mu_{i1}x_1 + \sum_{j=2}^{m}\mu_{ij}x_j\right) \quad (i=1,2,\ldots,n) \qquad \text{Equation 2}$$

If the first module $M_1$ is a fixed output module that always outputs the value $x_1=1$, then we have the following.

$$\frac{dx_i}{dt} = x_i\left(r_i + \mu_{i1}x_1 + \sum_{j=2}^{m}\mu_{ij}x_j\right) \quad (i=2,3,\ldots,n) \qquad \text{Equation 3}$$

Such that, $$x_i=1 \qquad \text{Equation 4}$$

Here, $r_i$ provides a fixed value (biased value) in the parentheses on the right side of the equation. If the role of $r_i$ is assumed by the weighted input $\mu_{i1}$ from the first module $M_1$ ($x_1=1$), which constantly outputs a fixed value of 1, then by assuming $\mu_{i1}$ is equivalent to $r_i$, the following equation can be formed.

$$\frac{dx_i}{dt} = x_i\left(\mu_{i1}x_1 + \sum_{j=2}^{m}\mu_{ij}x_j\right) \quad (i=2,3,\ldots,n) \qquad \text{Equation 5}$$

Based on this assumption, $$\mu_{i1}=r_i \qquad \text{Equation 6}$$

By returning the term $\mu_{i1}x_1$ in the parentheses to the $\Sigma$ on the right side of Equation 5, we have the following equation.

$$\frac{dx_i}{dt} = x_i\sum_{j=1}^{n}\mu_{ij}x_j \quad (i=1,\ldots,n) \qquad \text{Equation 7}$$

Therefore, by introducing a module with a fixed output, Equation 1 can be simplified to Equation 7. The right side of the equation can be calculated with an adding circuit for performing a sum calculation (configured by the variable resistors $V_{ij}$ [j=1–n] and the amplifier A in FIG. 1) and a multiplying circuit (the multiplier Tin FIG. 1) for multiplying the value $x_i$ by the result of the previous calculation. The values for $x_i$, when i=2, 3, . . . , n, are obtained by integrating this result using an integrating circuit (the integrator S in FIG. 1).

The time change pattern for values of $x_i$, when i=2, 3, . . . , n, can be changed arbitrarily by the value set for the interaction coefficient $\mu_{ij}$ (the value set in the variable resistors $V_{ij}$ [j=1–n] in FIG. 1). Therefore, the circuit connecting n number of modules $M_i$ in FIG. 1 can be used as an n−1 channel arbitrary function generator. The value of $\mu_{ij}$ of the $V_{ij}$ can be varied externally using an element such as a field effect transistor (FET).

This circuit can generate functions having considerable complexity with several to several tens of modules. As the number of elements, or n in Equation 7, becomes large, the number of connections increases on the order $n^2$, making integration difficult. An additional complex circuit must be provided separately to control the value $\mu_{ij}$ of the $V_{ij}$ externally.

Figure 3:
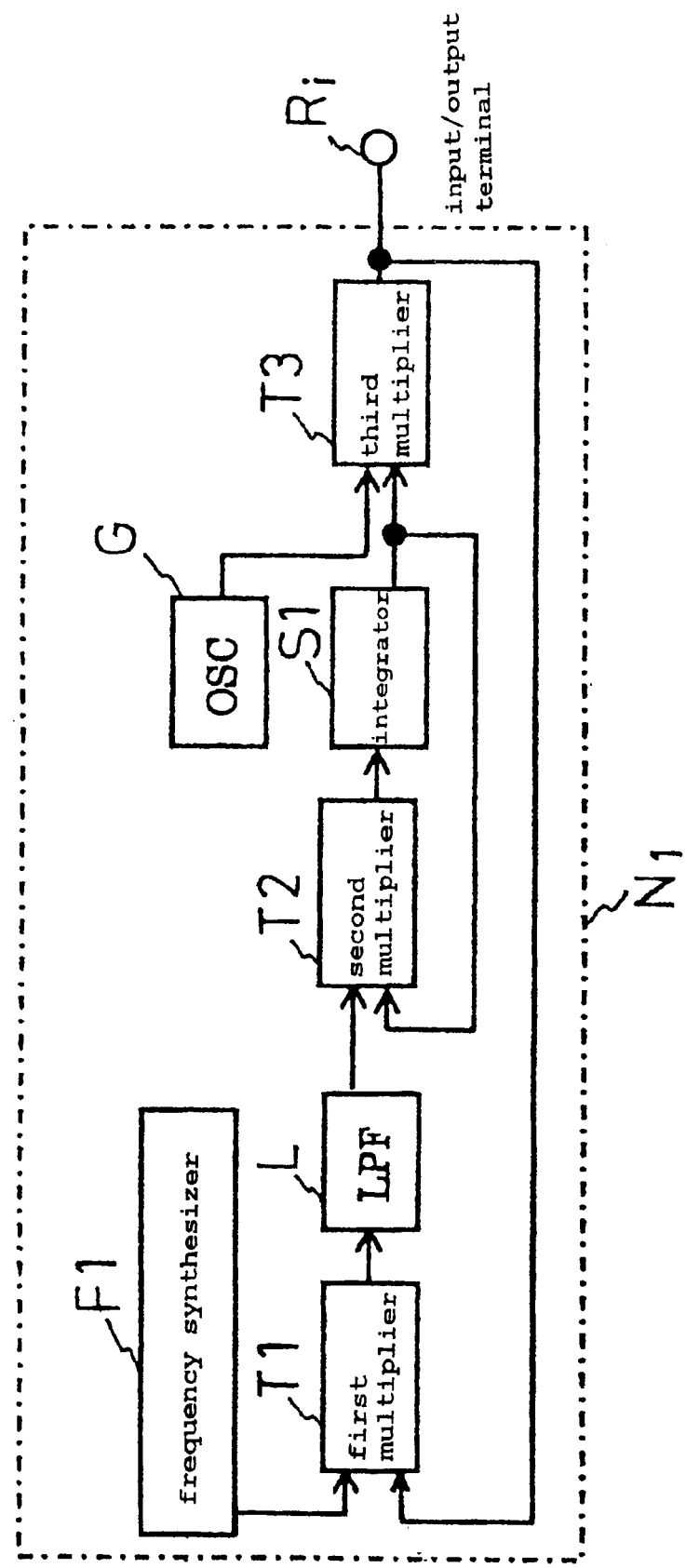
FIG. 3 is a block diagram showing a module of the second embodiment used in a random function generating circuit of the present invention.
Figure 4:
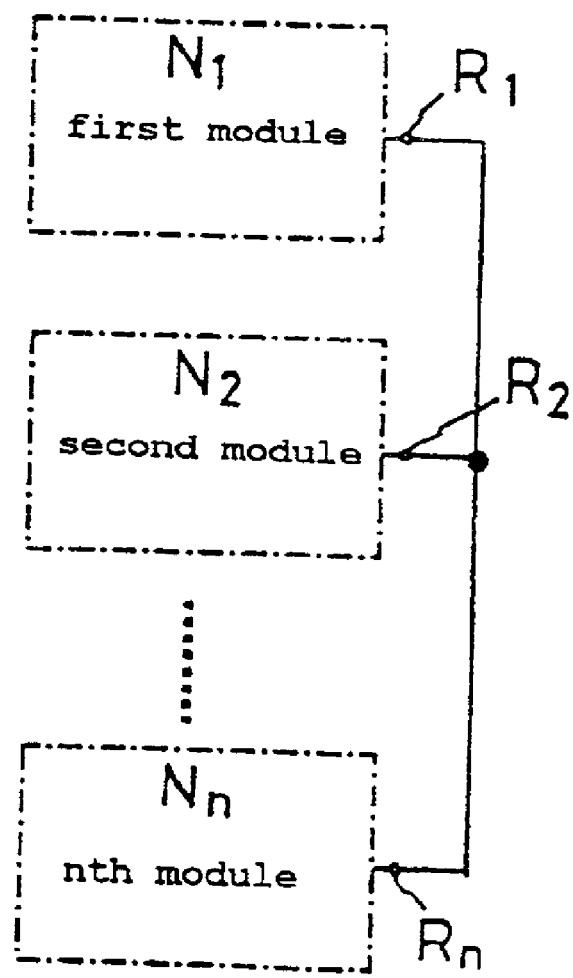
FIG. 4 is a block diagram showing the overall schematic of an arithmetic circuit of the second embodiment.

Next, a second embodiment of the present invention will be described with reference to FIGS. 3 and 4. FIG. 4 shows the overall schematic of an arithmetic circuit for the generalized Lotka-Volterra equation, while FIG. 3 is a block diagram of the circuit modules in that arithmetic circuit. Here, $N_i$ represents an arbitrary module. The arithmetic circuit is configured of n number of modules. Each module has one input/output terminal $R_i$. The input/output terminal $R_i$ for each module is connected to one signal bus line.

Each arbitrary module $N_i$ includes a frequency synthesizer F1; a first multiplier T1 for multiplying the output from the frequency synthesizer F1 with the value input from the signal bus line via the input/output terminal $R_i$; a low pass filter L for removing the AC component from the value output from the first multiplier T1; a second multiplier T2 into which the output from the low pass filter L is input; an integrator S1 for integrating the output from the second multiplier T2; a connecting circuit for inputting the value output from the integrator S1 into the second multiplier T2, enabling the second multiplier T2 to multiply this value from the value output from the low pass filter L; an oscillator G; and a third multiplier T3 connected to the input/output terminal $R_i$ for multiplying the value output from the oscillator G with the value output from the integrator S1.

When n is large, the input/output of the input/output terminals $R_i$ in the arbitrary modules $N_i$ shown in FIG. 3 are set to sine waves of differing frequency (the amplitude is set as the output value), and signal transfer is performed using frequency multiplexing. With this method, all signals can be transferred over one connection line (signal bus), achieving interconnection with a single connecting wire, as shown in FIG. 4. In other words, by setting the output value of the arbitrary module $N_i$ to $x_1 \sin \omega_1 t$. Signals from each arbitrary module $N_i$ are added to one connecting wire. Accordingly, the voltage of the connecting wire is calculated as follows.

$$e = x_1 \sin \omega_1 t + x_2 \sin \omega_2 t + \ldots + x_n \sin \Omega_n t \qquad \text{Equation 8}$$

The interaction coefficient $\mu_{ij}$ is similarly expressed by an AC signal. Accordingly, an interaction constant is supplied to the $x_i$ as the following voltage.

$$W_i = \mu_{1i} \sin \omega_1 t + \mu_{2i} \sin \omega_2 t + \ldots + \mu_{ni} \sin \omega_n t \qquad \text{Equation 9}$$

This is generated independently by the frequency synthesizer F1 provided internally in each arbitrary module $N_i$ or externally. The frequency synthesizer F1 can be an amplifying circuit that adds weight to the signal output from the oscillator G disposed inside each module or can be provided in the module shown in FIG. 3 as a completely independent circuit in order to eliminate all problems of phase deviation.

With the configuration of the arbitrary module $N_i$ shown in FIG. 3, the first multiplier T1 generates a signal by multiplying e by $W_i$. This multiplied signal contains a DC component (a component that changes slower than the carrier wave $\sin \omega_1 t$) and an AC component (the frequency being the sum and product of each carrier wave frequency). The DC component of this signal is obtained when the signal passes through the low pass filter L, as follows.

$$eW_i = \mu_{1i} x_1 + \mu_{2i} x_2 + \ldots + \mu_{ni} x_n \qquad \text{Equation 10}$$

The sum on the right side of Equation 10 is obtained in real-time. The second multiplier T2 multiplies the value of $x_i$ with this signal and outputs the result, which is the value on the right side of Equation 7. The integrator S1 integrates this signal to obtain the signal for $x_i$. Next, the third multiplier T3 multiplies the signal $x_i$ with a carrier wave $\sin \omega_i t$ signal generated by the oscillator G to generate an $x_i \sin \omega_i t$ signal. This resulting signal is simultaneously input into the first multiplier T1 and output externally via the input/output terminal $R_i$.

In this way, a calculation equivalent to the generalized Lotka-Volterra equation can be performed by connecting multiple modules $N_i$ by a single signal wire, as shown in FIG. 4.

A method for decreasing the number of connecting wires using different frequencies is a basic technology in analog multiplex communications. Reports for the hardware of neural networks (learning threshold elements) has already been published (Hirokazu Yokoi and Masao Saito, 1986; *New Learning Elements-Foulethret*; IEICE Transactions, Vol. J69-A, No. 6, pp. 1173–1175).

The second circuit type in the second embodiment of the present invention is novel in that it greatly reduces through signal frequency multiplexing the number of wires between modules necessary for calculating the generalized Lotka-Volterra equation in a circuit. While the number of wires in the circuit of the first embodiment increases on the order of $n^2$, that in the circuit of the second embodiment increases on the order of n.

In the circuit shown in FIG. 4, n number of modules is sufficient to calculate a generalized Lotka-Volterra equation having n elements. Since a more complex function can be expressed with a larger number n of modules, it is desirable to reduce as much as possible the number of overall components and wires required for mounting. According to the next method, a generalized Lotka-Volterra equation of an arbitrary scale (an arbitrary n) can be calculated with only one module.

Figure 5:
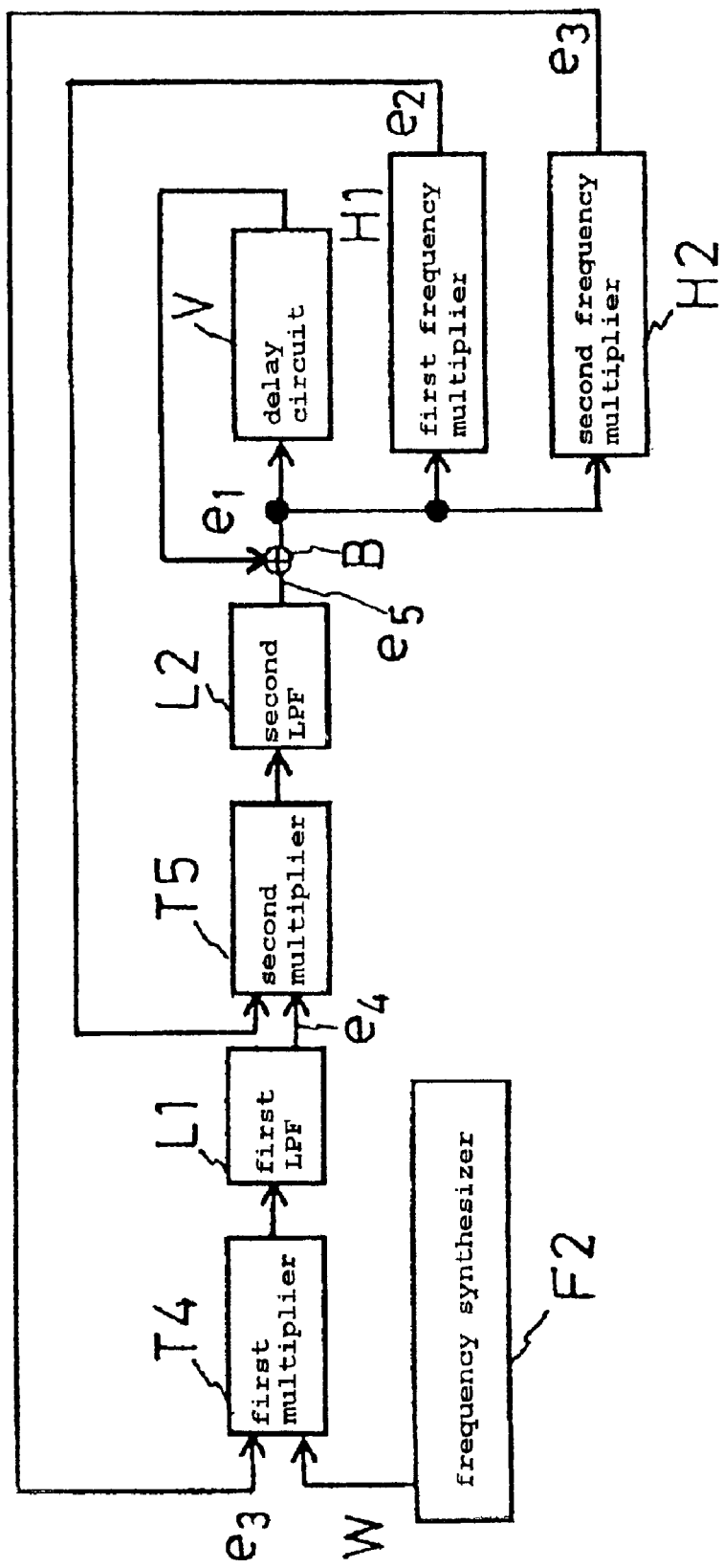
FIG. 5 is a block diagram showing the overall schematic of an arithmetic circuit of the third embodiment having only one module.

FIG. 5 shows the third embodiment of the present invention. FIG. 5 is a block diagram showing the overall schematic of the arithmetic circuit for the generalized Lotka-Volterra equation achieved in one module.

The module comprises a frequency synthesizer F2 that outputs a value W; a first multiplier T4 that receives the output value W as one input value; a first low pass filter L1 for cutting out the first frequency component from the value output from the first multiplier T4; a second multiplier T5 that receives the value $e_4$ output from the first low pass filter L1 as one input value; a second low pass filter L2 that removes a second frequency component lower than the first frequency component from the value output from the second multiplier T5; an adder B that receives the output value $e_5$ as one input value; a delay circuit V that delays the output value $e_1$ and sets the output value $e_1$ as the second input value to the adder B; a first frequency multiplier H1 that multiplies the frequency of the output value $e_1$ and outputs an output value $e_2$ as the second input value for the second multiplier T5; and a second frequency multiplier H2 that multiplies the frequency of the output value $e_1$ and outputs an output value $e_3$ as the second input value for the first multiplier T4.

By setting a carrier frequency according to a method described later and performing the calculation using the circuit shown in FIG. 5, it is possible to achieve the same effects as the circuit in the second embodiment with fewer components.

The amplitude of the signal $x_i$, where $i = 1, 2, \ldots, n$, in Equation 7 is expressed by the AC signal $x_i \sin(i\omega_0)$ for $i = 1, 2, \ldots, n$. Here, $\omega_0$ is the basic angular frequency and the value is arbitrary (the value is determined according to the objective and application and the frequency characteristics of the components during actual manufacturing). In other words, $x_1$ is expressed by the strength of the signal having an angular frequency of an integral multiple of $\omega_0$.

All signals can be added and transferred over one signal line, since each AC signal is linearly independent from the others (that is, signal transfer using frequency multiplexing). A frequency multiplexed signal obtained by adding all frequencies is shown in the following equation.

$$e_1 = x_1 \sin(\omega_0) t + x_2 \sin(2\omega_0) t + \ldots + x_n \sin(n\omega_0) t \qquad \text{Equation 11}$$

The frequency multiplexed signal $e_1$ is set as the input value of the delay circuit V in FIG. 5.

The $e_1$ is delayed only a time sufficiently longer than the period of the base frequency $\omega_0$ ($2\pi/\omega_0$) by the delay circuit V and is again input into the delay circuit V after passing through the adder B. In other words, the $e_1$ is output from the delay circuit V and returns to the delay circuit V, and is therefore constantly maintained in this closed loop.

The signal added to $e_1$ in the adder B is set to the frequency multiplexed differential signal $de_1/dt$ shown in the following equation. This differential signal is multiplexed in the same way as the differential value $dx_i/dt$ defined on the left side of Equation 7, where $i = 1, 2, \ldots, n$.

$$\frac{de_1}{dt} = \frac{dx_1}{dt}\sin(\omega_0)t + \frac{dx_2}{dt}\sin(2\omega_0)t + \ldots +$$
$$\frac{dx_n}{dt}\sin(n\omega_0)t \qquad \text{Equation 12}$$

Hence, $e_1$ and $de_1/dt$ are added by the adder B.

$$e_1 + \frac{de_1}{dt} = \left(x_1 + \frac{dx_1}{dt}\right)\sin(\omega_0)t + \qquad \text{Equation 13}$$
$$\left(x_2 + \frac{dx_2}{dt}\right)\sin(2\omega_0)t + \ldots +$$
$$\left(x_n + \frac{dx_n}{dt}\right)\sin(n\omega_0)t$$

Since this addition equation is exactly the integral calculation performed according to the Euler method, the integral calculation of Equation 7 is achieved by a closed loop circuit formed by the adder B and delay circuit V.

A major issue is how to construct the frequency multiplexed differential signal $de_1/dt$ with a simple circuit. The present invention solves this problem by multiplying two signals having differing frequencies and twice making use of the phenomenon in which a beat signal corresponding to the differential frequency between the two is generated, as described below.

The first frequency multiplier H1 multiplies the frequency of the signal $e_1$ by $\alpha$ (n<<$\alpha$) and outputs the signal $e_2$.

$$e_2 = x_1\sin(\alpha\omega_0)t + x_2\sin(2\alpha\omega_0)t + \ldots + x_n\sin(n\alpha\omega_0)t \qquad \text{Equation 14}$$

Similarly, the second frequency multiplier H2 multiplies the frequency of the signal $e_1$ by $\beta$ ($\alpha$<<$\beta$) and outputs the signal $e_3$.

$$e_3 = x_1\sin(\beta\omega_0)t + x_2\sin(2\beta\omega_0)t + \ldots + x_n\sin(n\beta\omega_0)t \qquad \text{Equation 15}$$

The frequency synthesizer F2 generates at once a signal W that multiplexes the interaction coefficient $\mu_{ij}$, such that i and j=1, 2, . . . , n, as follows, and outputs the signal W.

$$W = \mu_{11}\sin(\beta\omega_0+\alpha\omega_0+\omega_0)t + \mu_{12}\sin(2\beta\omega_0+\alpha$$
$$\omega_0+\omega_0)t + \ldots + \mu_{1n}\sin(n\beta\omega_0+\alpha\omega_0+\omega_0)t$$
$$+\mu_{21}\sin(\beta\omega_0+2\alpha\omega_0+2\omega_0)t + \mu_{22}\sin(2\beta\omega_0+2\alpha\omega$$
$$_0+2\omega_0)t + \ldots + \mu_{2n}\sin(n\beta\omega_0+2\alpha\omega_0+2\omega_0)t$$
$$+\mu_{n1}\sin(\beta\omega_0+n\alpha\omega_0+n\omega_0)t + \mu_{n2}\sin(2\beta\omega_0+n\alpha\omega$$
$$_0+n\omega_0)t + \ldots + \mu_{n2}\sin(n\mu\omega_0+n\alpha\omega_0+n\omega_0)t \qquad \text{Equation 16}$$

With the construction described above, the first multiplier T4 first multiplies the $e_3$ and the W generated by the frequency synthesizer F2 to generate a signal comprising the sum frequency and difference frequency of an AC signal that includes $e_3$ and W. The first low pass filter L1 removes the frequency component greater than a frequency near $\beta\omega_0$ and outputs the following signal $e_4$.

$$e_4 = \left(\sum_{j=1}^{n}\mu_{1j}x_j\right)\sin(\alpha\omega_0+\omega_0)t + \qquad \text{Equation 17}$$

-continued
$$\left(\sum_{j=1}^{n}\mu_{2j}x_j\right)\sin(2\alpha\omega_0+2\omega_0)t + \ldots +$$
$$\left(\sum_{j=1}^{n}\mu_{nj}x_j\right)\sin(n\alpha\omega_0+n\omega_0)t$$

Next, the second multiplier T5 multiplies $e_2$ and $e_4$. The second low pass filter L2 removes the frequency component greater than a frequency near $\alpha\omega_0$ and outputs the following signal $e_5$.

$$e_5 = x_1\left(\sum_{j=1}^{n}\mu_{1j}x_j\right)\sin(\omega_0)t + \qquad \text{Equation 18}$$
$$x_2\left(\sum_{j=1}^{n}\mu_{2j}x_j\right)\sin(2\omega_0)t + \ldots +$$
$$x_n\left(\sum_{j=1}^{n}\mu_{nj}x_j\right)\sin(n\omega_0)t$$

This equation expresses the right side of Equation 2 that is multiplexed. In other words, this equation corresponds to the multiplexed differential signal $de_1/dt$.

The signal $e_5$ ($de_1/dt$) is added to the signal $e_1$ that has passed through the delay circuit V by the adder B, thereby integrating Equation 2 by the method described above.

This method theoretically enables Equation 7 to be calculated for an arbitrary n using only one circuit shown in FIG. 5. Due to the difference in initial values of $l_i|_{t=0}$, and the signal W in Equation 16 in the circuits of FIG. 5, $l_i$ demonstrates various differing time change patterns. Accordingly, by interpreting $l_i|_{t=0}$ as the value to be encoded (modulated) and W as the key code for encryption, then the time change pattern of $l_i$ or the signal $l_i|_{t=T}$ in time T can be used as the signal to be encoded (modulated). It is also possible to assume the opposite, that is, that W is the value to be encoded (modulated) and $l_i|_{t=0}$ is the key code for encryption.

As described above, it is possible to encode or modulate signals using the arithmetic circuits of FIG. 5. It is also possible to decode or demodulate the encoded signals to the original signal according to a key code using the same arithmetic circuits.

Next, the signal decryption method will be described in greater detail.

Figure 6:
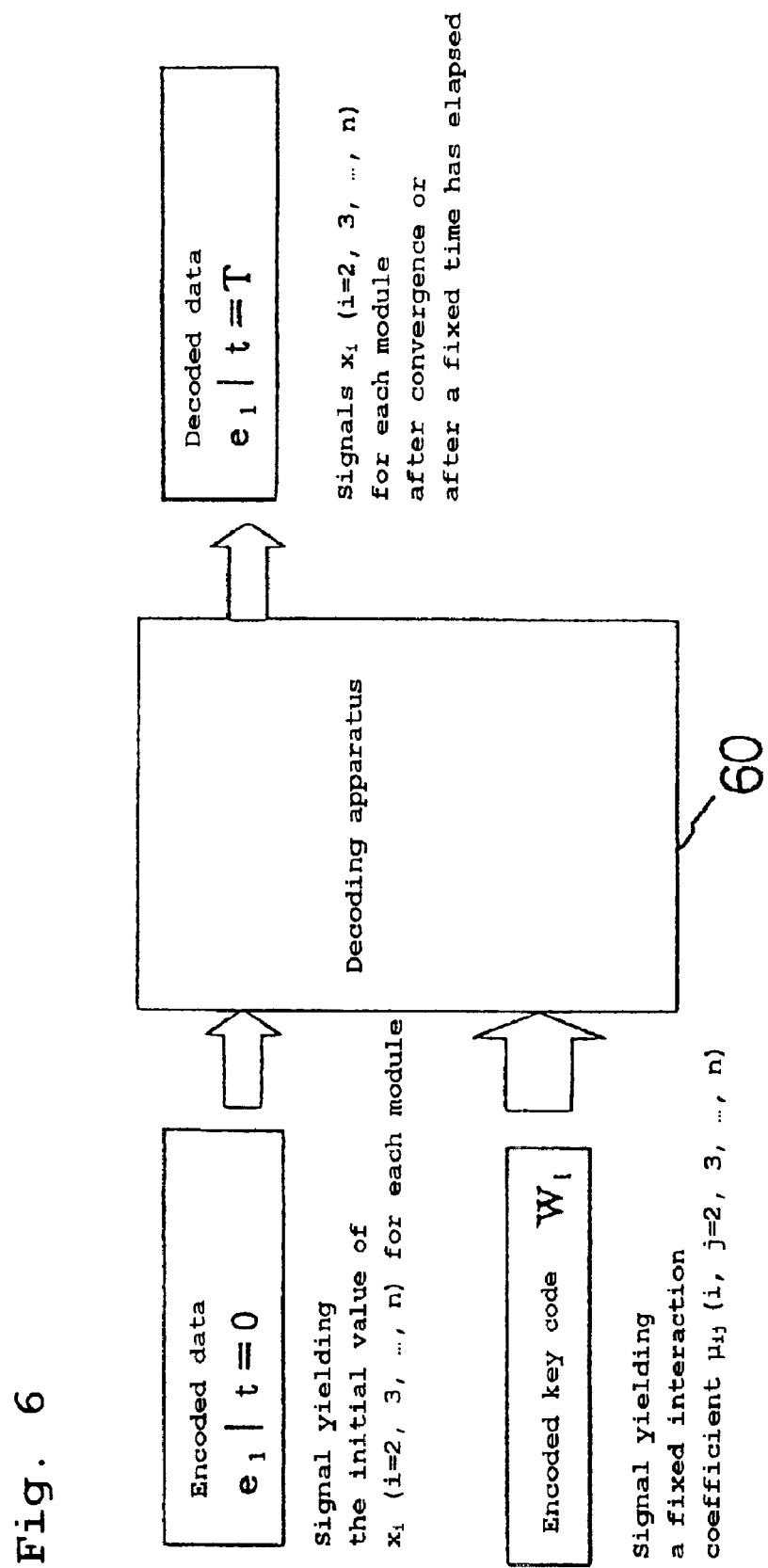
FIG. 6 is an explanatory diagram showing a decryption apparatus using the circuit of the present invention.

FIG. 6 shows an example configuration of a decryption apparatus 60 used for decoding encoded signals. $x_i$ can be various functions depending on the value set for the interaction coefficient $\mu_{ij}$, such that i and j=1, 2, 3, . . . , n, and the initial value of $x_i$, such that i=1, 2, 3, . . . , n. Encryption uses this property as described below.

Figure 7:
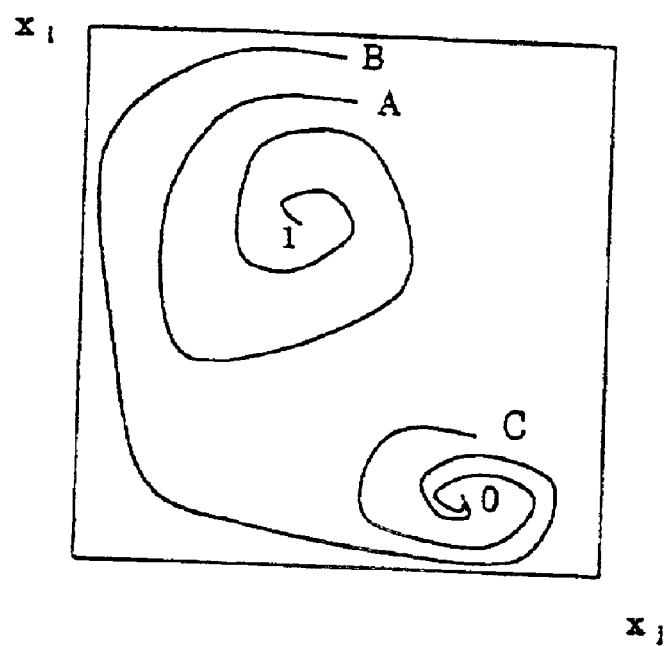
FIG. 7 is an explanatory diagram showing paths indicating changes in the value of $x_i$ over time on a plane formed by the two module outputs.
Figure 8:
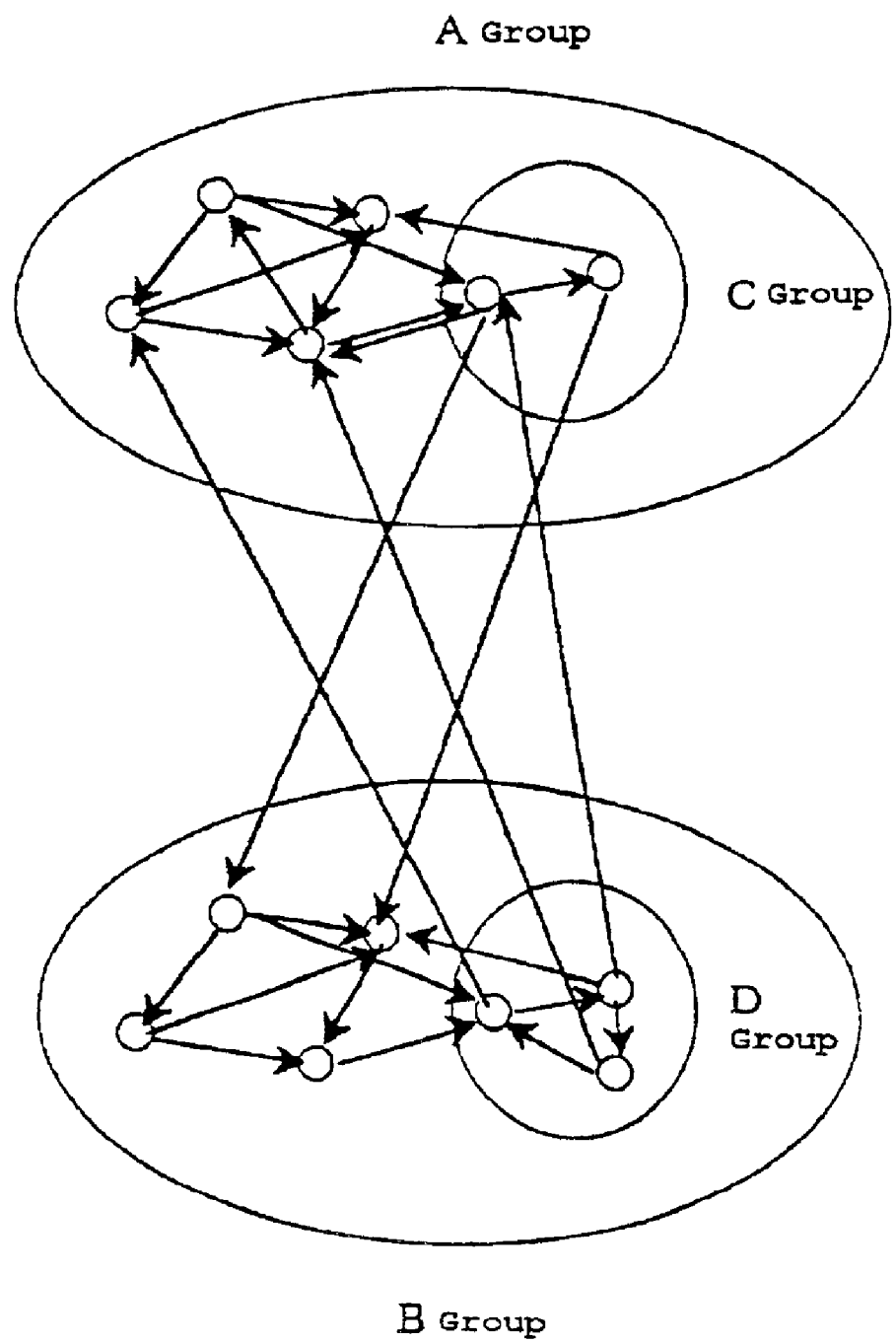
FIG. 8 is an explanatory diagram showing a public key encryption method using the system of the present invention.

The output values of n units are variables in which n−1 variables change according to time, while one unit outputs a fixed value. For purposes of simplifying the description, we will choose two variables $x_k$ and $x_l$ and consider a path traveled by a point p at the coordinates $x_k$ and $x_l$ in the plane passing through these two variables (see FIG. 7). According to the work of the arbitrary function generation of the circuit, the path of the point p moves in an extremely large variety of patterns from an initial value A Point. Here we will assume that the interaction coefficient $\mu_{ij}$, such that i and j=1, 2, 3, . . . , n, converges at a point 1 when starting from the initial value A Point after describing a spiral path and converges at a point 0 when starting from initial points B and C. We will further assume that the points of convergence are only these two points 1 and 0. Accordingly, the transmitter can safely transmit one-bit data indicating 1 or 0.

Hence, the transmitter can send a signal corresponding to the point A when wishing to send the data "1" safely and a signal corresponding to the point B when wishing to send the data "0." The receiver can accurately learn the data at the convergence point by applying the previously prepared interaction coefficient $\mu_{ij}$ to the decryption apparatus 60. For example, when the transmitter sends data for the point A, the receiver inputs data for the point A and data for the interaction coefficient $\mu_{ij}$ into the decryption apparatus 60 to accurately learn that the convergence point is 1.

Since the combinations of the interaction coefficient $\mu_{ij}$ are nearly infinite, it is nearly impossible for someone unaware of the true value of the interaction coefficient to guess the interaction coefficient $\mu_{ij}$ from the transmitted data. Accordingly, it would be extremely difficult to decode data that has been encoded by the decryption apparatus 60.

Next, the method of encoding the signals with an encryption apparatus will be described in more detail.

When Not Using a Public Key (Interaction Coefficient $\mu_{ij}$)

The process below is followed in order to encode data equivalent to the point 1.

(1) An initial value is generated arbitrarily. If the value converges to the point 1 in the encryption apparatus, that initial value is used as the encoded value. If, however, the initial value converges at point 0, that initial value is discarded and another initial value is generated arbitrarily.

(2) Step (1) is repeated until an initial value that converges at point 1 is obtained. The procedure for encoding a value corresponding to the point 0 can be performed according to the same method.

When Using a Partially Public Key

When transferring encoded credit card numbers for mail orders and the like, it is necessary to transfer a key for the encryption by mail. This is highly inconvenient. Therefore, a public key encryption method is necessary. The conventional method using prime numbers utilizes the fact that an extremely large method would be required to factor out prime factors from large numbers. Accordingly, the method is flawed in that security drops abruptly with improvements in computer performance and the development of efficient prime factorization algorithms. The method described below encodes while performing simulation using analog operations, and therefore has extremely tight security, since the amount of calculations required for a third party to decode the data is nearly infinite. The procedure for performing encoded data transfers by a public key encryption using the encryption apparatus is described below.

Preparations

A group of n units forming the present apparatus is divided into an A group and a B group. The A group is a group of units for the encryption apparatus possessed by the encoder and transmitter. The B group is a group of units for the decryption apparatus possessed by the decoder. Most of the interaction coefficient $\mu_{ij}$ between the A and B groups of units are 0, while only a specific interaction coefficient is a value other than 0. Only some of the units in the B group are connected by an interaction coefficient other than 0 to the A group and affect the B group. This group is called the C group. Similarly, a portion of units in the A group are connected to the B group by an interaction coefficient other than 0 and affect the A group. This group is called the D group.

For simplicity, let us assume that the interaction coefficients are set to have only two convergence points, such that the output values $x_k$, $x_l$, $x_a$, and $x_b$ from four units have two convergence points in a four-dimensional area. The units k and l outputting the variables $x_k$ and $x_l$ belong to the A group (however, the output values do not belong in the public C group) and the units a and b outputting the variables $x_a$, $x_b$ belong to the B group (however, their output values do not belong in the public D group). The convergence point in the plane of variables $x_k$ and $x_l$ has a one-on-one correspondence with the convergence point in the plane of variables $x_a$ and $x_b$. The interaction coefficient and growth rate (fixed parameter $r_i$) are preset to enable estimation of the convergence point in the plane of $x_k$ and $x_l$ from the convergence point from the plane of $x_a$ and $x_b$.

While the transmitter only possesses data concerning the A group, the transmitter can dynamically extract data regarding the D group from the receiver to perform calculations for the A group units. In other words, the transmitter can simulate (calculate) movement of the coordinates ($x_k$, $x_l$) from data on the A group and D group. Similarly, the receiver can simulate movement of the coordinates ($x_a$, $x_b$) from data concerning the B and C groups.

Public Key Data

To encode and transmit data, the transmitter acquires data of the interaction coefficient $\mu_{ij}$ and fixed parameter $r_i$ for the A group made public by the receiver and acquires of data of the output value $x_i$ for the C group (i being the unit number of the C group) as unencrypted data. Using this data, the transmitter performs a simulation of the A group.

Encryption Accompanying Normal Interactive Communications

Since output values from the C group vary during the simulation, the transmitter simulates the A group while receiving unencrypted output values for the C group in real-time, in order to simulate the A group. At the same time, the receiver simulates the B group while receiving unencrypted data for the D group from the transmitter in real-time. In other words, the receiver and transmitter exchange unencrypted data on the D and C groups in real-time, while the transmitter simulates the A group and the receiver simulates the B group independently. It is obvious that a third party cannot participate in this interactive communication.

Data that the transmitter wishes to send encrypted and the initial values of the A group are not known to the receiver or a third party. The receiver can estimate data concerning the convergence value of the A group from position data for the convergence point in the B group simulation. However, a third party cannot simulate either the A or B groups because the third party does not possess the initial values for the A group or data for the B group. Accordingly, a third party cannot decode the encrypted data.

The arbitrary function generating circuit according to the present invention constructed of a simple calculation element and the encryption/modulation method using this circuit demonstrates the following effects.

(1) The present invention is a high-speed processing device for performing simulations. That is, the present invention can be used to perform high-speed simulations of a generalized Lotka-Volterra equation, which is employed as a complex and dynamic biological model for simulating such processes as changes in the number of species in a biosystem and the growth of plants. The arbitrary m function generating function of the present invention can be applied to a general simulator for such complex systems as market conditions and economic fluctuations and has a wide range of applications as a high-speed simulator for complex systems.

(2) The present invention can be used as an apparatus for generating complex waveforms. Accordingly, extremely complex waveforms can be generated with a relatively simple circuit simply by changing a small portion of the circuit parameters slightly, it is possible to create various waveforms. Since periodic or a periodic waveforms can be generated according to the parameters, the invention can be used as a sound generator for electronic instruments or game machines. Further, since a slight change in parameters can generate irregular waveforms, the present invention can also apply to warning sirens and the like for preventing the threat of harmful pests.

(3) The present invention can apply to an encryption apparatus. A generalized Lotka-Volterra equation has a plurality of equilibrium points according to the parameters and converges at different equilibrium points depending on the initial value. The set of initial values is infinite while the number of equilibrium points is finite. Therefore, data for secure transfer is encrypted as position data of a equilibrium point. When the transmitter sends the data, one initial value from the set of initial values that converge at this equilibrium point is arbitrarily selected. Using a circuit with the same parameter values, the receiver can find the convergence point. However, it is nearly impossible for a third party to decode the message without knowledge of these parameters. Accordingly, the present invention can be applied to an encryption apparatus for high-speed and extremely secure data transfer.

(4) The present invention can apply to a pattern recognition apparatus. Using a circuit having the same plurality of equilibrium points as the encryption apparatus described above, an initial value vector is set to the input pattern and a converging point is set to the recognition result. By establishing appropriate parameters in advance, the present invention can therefore be applied to a high-speed pattern recognition apparatus. Existing nonlinear optimal algorithms can be used to determine appropriate parameters.

(5) The present invention can be used for encryption and decryption signals in spread spectrum communications. A circuit having a plurality of equilibrium points describes a certain path before arriving at the equilibrium point. This type of nonlinear system possesses robustness in achieving the same equilibrium point, even though a certain level of noise is generally introduced into the signal. The larger value n, the more robust the system is to noise. Accordingly, the circuit types 2 and 3 described in embodiments 2 and 3, respectively, having an n as large as possible are most appropriate.

The output from the third multiplier of the type 2 and the output from the second frequency multiplier of the third circuit type have an extremely broad spectrum from the low frequency to high frequency range. After modulation, this signal can be transmitted in a transmission wave having an extremely broad band. The demodulated signal is input into a circuit on the receiving end having the same circuit constant and the same components as those on the transmitting end (output from the third multiplier in the type 2 and output from the second frequency multiplier in the type 3). The receiver can therefore obtain correct data, providing the noise introduced into the signal is not large, since the signal describes the same path as that for the transmitter and reaches the correct equilibrium point. Even if the demodulated signal contains a large amount of noise, converging on a tractor point will increase the percentage of the signal reaching the same equilibrium point as the transmitters. This percentage is greater with a larger n.

What is claimed is:

1. An arbitrary function generating circuit employing a simple arithmetic circuit element for calculating the following generalized Lotka-Volterra equation (Equation 1), $$\frac{dx_i}{dt} = x_i\left(r_i + \sum_{j=1}^{m} \mu_{ij}x_j\right) \quad (i = 1, 2, \ldots, n) \qquad \text{Equation 1}$$

($x_i$ is the size of a population i representing the elements of a system; $\mu_{ij}$ is a constant of interaction between the elements; and $r_i$ is an intrinsic constant for each element representing the growth rate of the population i;) the arbitrary function generating circuit comprising:

a plurality n of modules, each having a plurality n of input terminals and one output terminal; and a plurality n of connecting wires including a first connecting wire for connecting the output terminal of the first module to the first input terminal of each module; a second connecting wire for connecting the output terminal of the second module to the second input terminal of each module; and continuing in a like manner until the nth connecting wire for connecting the output terminal of the nth module to the nth input terminal of each module;

each module comprising:

a group of n variable resistors connected to the n input terminals;

an output sum connecting wire connecting the output terminals of the variable resistors to total their output values;

a multiplier having an amplifier for multiplying the total of the output values by the output value from the corresponding module; and an integrator for integrating the output values.

2. An arbitrary function generating circuit as recited in claim 1, either further comprising interaction constant setting means for programmably changing each value in the group of variable resistors in each module or providing FET semiconductor element circuits as the variable resistors in each module and varying the resistance values in the variable resistors externally using control signals.

3. An arbitrary function generating circuit employing a simple arithmetic circuit element for calculating a generalized Lotka-Volterra equation, the circuit comprising:

a plurality (n) of modules each having one input/output signal terminal, and one signal bus connecting each of the input/output signal terminals;

each module comprising:

a frequency synthesizer;

a first multiplier for multiplying the output from the frequency synthesizer with the value input from the signal bus via the input/output terminal;

a low pass filter for removing the AC component from the value output by the first multiplier;

a second multiplier into which the output from the low pass filter is input;

an integrator for integrating the output from the second multiplier;

a connecting circuit for inputting the value output from the integrator into the second multiplier, such that the second multiplier can multiply this value with the value output by the low pass filter;

an oscillator; and a third multiplier connected to the input/output terminal for multiplying the value output by the oscillator with the value output from the integrator.

4. An arbitrary function generating circuit as recited in claim 3, further comprising a means for setting the voltage $W_1$ with the frequency synthesizer that is provided either external to the module as an amplifying circuit for extracting signals from the internal oscillator and adding weight to the signal or internal to the module as an independent circuit.

5. An arbitrary function generating circuit employing a simple arithmetic circuit element for calculating a generalized Lotka-Volterra equation, the circuit comprising:

a frequency synthesizer that outputs a value W;

a first multiplier that receives the output value W as one input value;

a first low pass filter for cutting out a first frequency component from the value output from the first multiplier;

a second multiplier that receives the value $e_4$ output from the first low pass filter as one input value;

a second low pass filter that removes a second frequency component lower than the first frequency component from the value output of the second multiplier;

an adder that receives the output value $e_5$ as one input value;

a delay circuit that delays the output value $e_1$ and sets the output value $e_1$ as the second input value to the adder;

a first frequency multiplier that multiplies the frequency of the output value $e_1$ and outputs an output value $e_2$ as the second input value for the second multiplier; and a second frequency multiplier that multiplies the frequency of the output value $e_1$ and outputs an output value $e_3$ as the second input value for the first multiplier.

6. An encryption method using an arbitrary function generating circuit according to claim 5, wherein the initial value $e_1|_{t=0}$ of the frequency multiplexed signal $e_1$ is used as the code to be encrypted and the signal W output from the frequency synthesizer is used as the key code for encryption; and a time change pattern of the signal $e_1$ or the signal $e_1|_{t=T}$ at a time T is encrypted.

7. An encryption method using an arbitrary function generating circuit according to claim 5, wherein the signal W output from the frequency synthesizer is used as the code to be encrypted and the initial value $e_1|_{t=0}$ of the frequency multiplexed signal $e_1$ is used as the key code for encryption; and a time change pattern of the signal $e_1$ or the signal $e_1|_{t=T}$ at a time T is encrypted.

* * * * *